J. G. COOKE.
MOTOR COOLING SYSTEM.
APPLICATION FILED JULY 24, 1909.
980,068.
Patented Dec. 27, 1910.
2 SHEETS—SHEET 1.
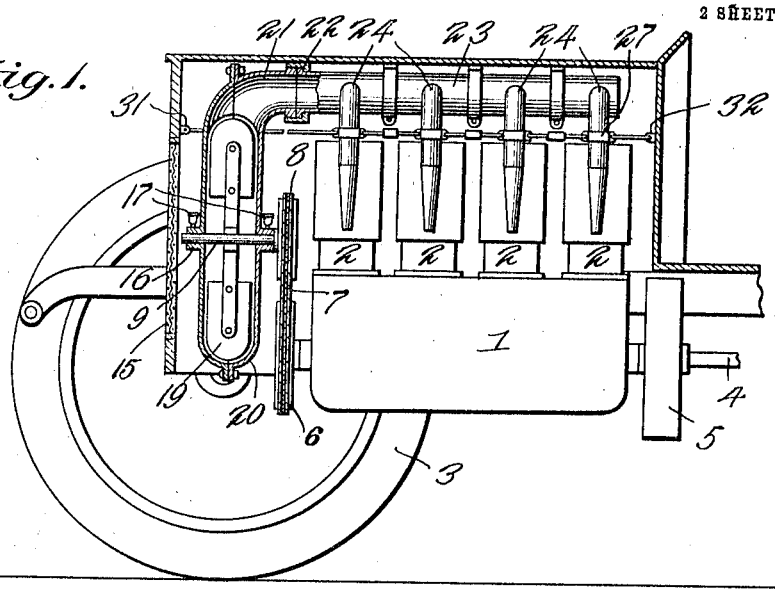
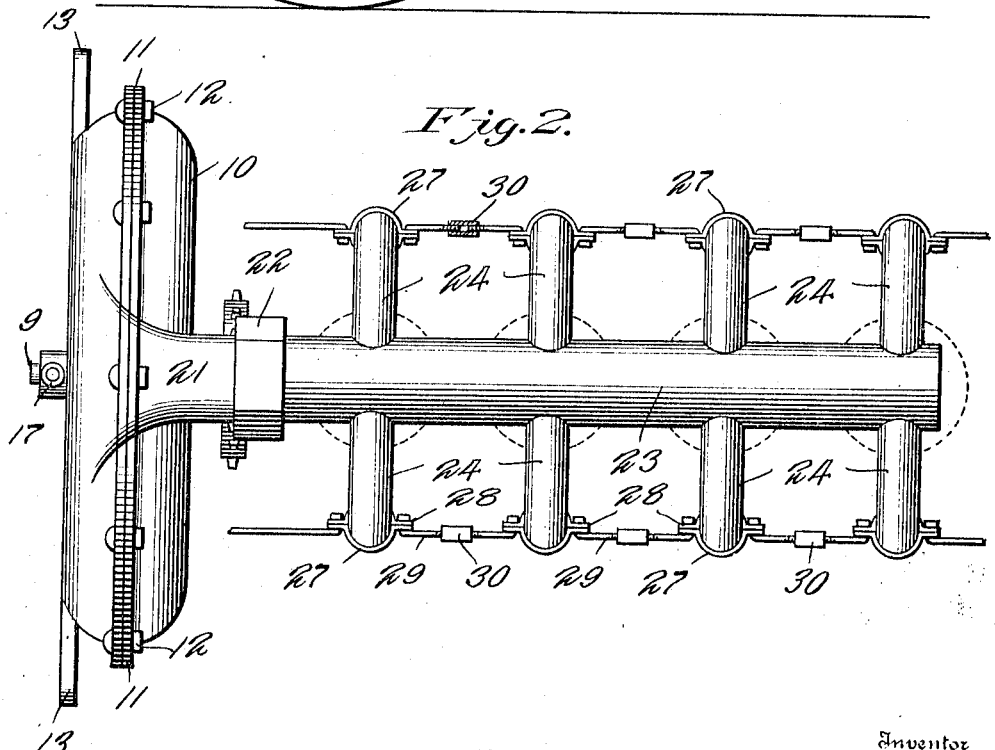
Witnesses
Edwin G. McKee
P. M. Smith
Inventor
John Gordon Cooke
By Victor J. Evans
Attorney J. G. COOKE.
MOTOR COOLING SYSTEM.
APPLICATION FILED JULY 24, 1909.
980,068.
Patented Dec. 27, 1910.
2 SHEETS—SHEET 2.
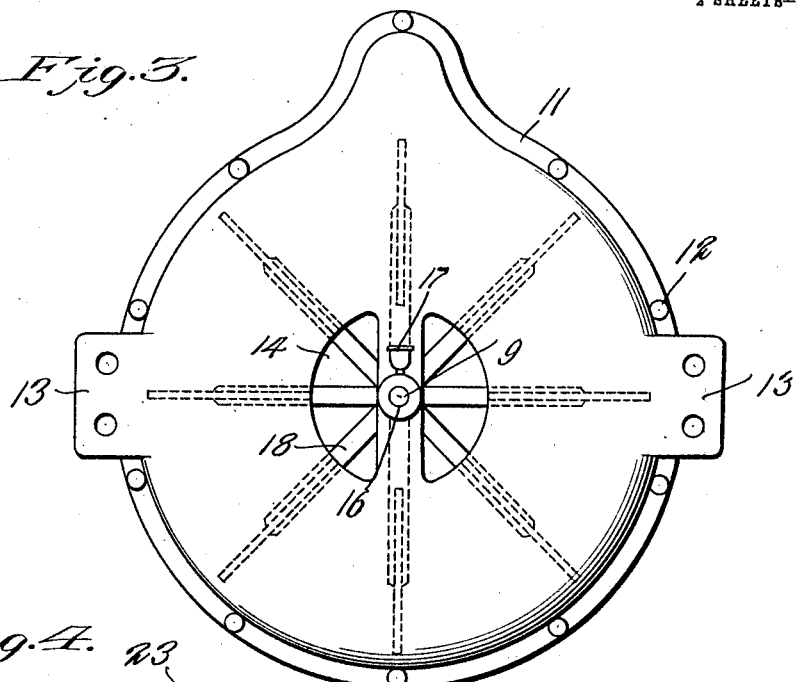
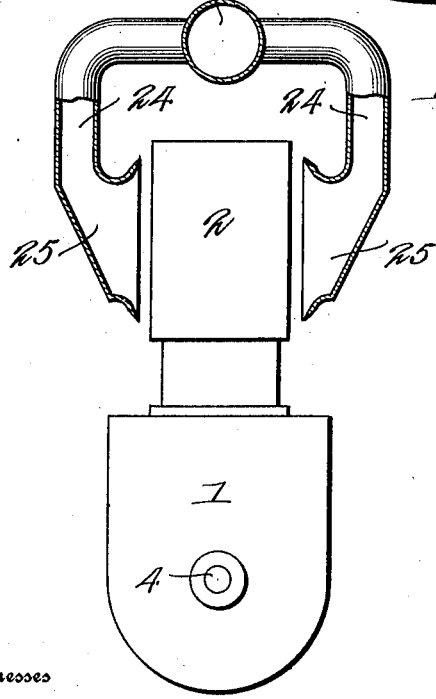
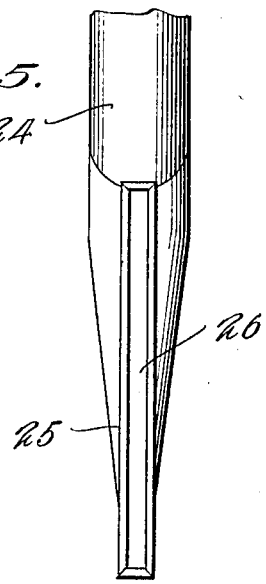
Witnesses
Edwin G. McKee
P. M. Smith
Inventor
John Gordon Cooke
By Victor J. Evans
Attorney

UNITED STATES PATENT OFFICE.

JOHN GORDON COOKE, OF CHLORIDE, ARIZONA TERRITORY.

MOTOR-COOLING SYSTEM.

980,068.

Specification of Letters Patent. Patented Dec. 27, 1910.

Application filed July 24, 1909. Serial No. 509,319.

*To all whom it may concern:*

Be it known that I, JOHN GORDON COOKE, a citizen of the United States, residing at Chloride, in the county of Mohave and Territory of Arizona, have invented new and useful Improvements in Motor-Cooling Systems, of which the following is a specification.

This invention relates to internal combustion engines, the object in view being to provide an improved air cooling system by means of which the cylinders and valve casings and other parts connected with the cylinders may be effectively cooled by a constant current of air which is caused to circulate freely around and about the cylinders at all times while the engine is in operation.

With the above general object in view, the nature of which will more fully appear as the description proceeds, the invention consists in the novel construction, combination and arrangement of parts as herein fully described, illustrated and claimed.

In the accompanying drawings:—Figure 1 is a side elevation of an internal combustion motor, showing the air cooling apparatus of this invention, partly in elevation and partly in section. Fig. 2 is an enlarged plan view of the apparatus. Fig. 3 is a front elevation of the fan and fan casing. Fig. 4 is a front elevation of one of the cylinders of the motor, showing a portion of the air cooling apparatus adjacent thereto including the oppositely located nozzles which are shown in section. Fig. 5 is an inner face view of one of the nozzles on an enlarged scale.

Referring to the drawings, 1 designates the crank case of an internal combustion motor and 2 the cylinders thereof. The motor is shown in Fig. 1 as mounted upon and used in connection with an automobile at which the front wheels are represented at 3. 4 designates the engine shaft provided with the usual fly wheel 5 and having mounted on its forward end a sprocket wheel 6 from which a chain 7 runs around another sprocket wheel 8 on the shaft 9 of a fan or blower. The fan casing 10 which is best shown in Figs. 2 and 3, comprises oppositely arranged circular sections provided with flanges 11 adapting them to be bolted or otherwise secured together by suitable fasteners 12. The forward section of the casing is provided with attaching lugs 13, by means of which the fan casing may be secured to the frame of the automobile or other machine. In the front of the casing there are arranged one or more air inlet apertures 14 to enable the air to be sucked inward from the front of the machine through a suitable grating or screen 15 taking the place of an ordinary water radiator now in common use.

The fan shaft 15 is mounted in suitable bearings 16 in the opposite sections of the fan casing which bearings are lubricated by oil cups 17 or any other convenient manner. The fan comprises a plurality of radiating arms 18 to which are connected blades 19 the outer ends of which are preferably round as shown in Fig. 1, the periphery of the fan casing being also half round as shown at 20. At the top, the fan casing is provided with an outwardly and rearwardly extending elbow or discharge outlet 21 to which is connected by means of a union or coupling 22 a trunk pipe 23 which extends backward over the tops of the cylinders 2, as clearly shown in Fig. 1 and indicated in Fig. 2. Just above each of the cylinders 2 branch pipes 24 extend in opposite directions from the pipe 23 and downward at opposite sides of the cylinders where they terminate in inwardly facing enlarged and flaring nozzles 25 each of which is formed with an elongated mouth 26, the elongation of the mouth being in the direction of length of the cylinder, as clearly indicated in Fig. 4. In this way, diametrically opposite blasts of cold air are directed against corresponding points of each cylinder of which the engine is composed, thus supplying to each cylinder a separate and independent current of air at two diametrically opposite points. The air thus directed against the cylinders is not confined in any way but is liberated directly under the hood of the engine and is free to escape immediately thereby allowing the fresh cool air to be constantly directed against each and all of the cylinders at a plurality of points.

The branch pipes 24 each side of the line of cylinders are connected by means of sectional braces each composed of a plurality of sectional collars or bands 27 embracing the branch pipes 24 and provided with abutting flanges 28 through which are inserted the bent and headed ends of rods 29 which are threaded with right and left hand threads at their inner adjacent ends to receive turn buckles 30 whereby slack may be taken up in the rods in a manner clearly indicated in Fig. 2. The said braces are preferably connected at their forward ends to the front wall of the hood as shown at 31 while the rear ends thereof are connected to the dash board or other convenient support as shown at 32. In this way, all of the branch pipes are thoroughly braced and supported and whenever necessary, for the purpose of cleaning or taking down the engine, the trunk pipe 23 together with the branch pipes 24 and braces connecting said branch pipes may be readily removed by unscrewing the coupling 22 and disconnecting the ends of the braces or studs from the dash board and front wall of the hood. The fan casing itself may be easily unmounted when necessary by disconnecting the lugs 13 from the machine frame.

The air cooling apparatus is supported under the hood and is wholly independent of the engine so that removal of the engine or of the cooling apparatus can be effected with ease and despatch. Furthermore the cooling apparatus is in the nature of an attachment which can be applied to engines already in use as it does not enter into the construction of the engine, being entirely separated therefrom.

I claim:—

In a motor vehicle, the combination of an engine, a hood mounted over the engine and having an opening at its front, a fan mounted wholly on the hood at a point between the opening thereof and the front of the engine, a conduit connected with the fan and extending rearwardly therefrom over the top of the engine and carried wholly by the top of the hood at the under side thereof, branches extending from opposite sides of the conduit and depending therefrom with their lower ends open and disposed to direct cooling air against the exterior of the engine cylinder, and operating means between the engine and fan for rotating the latter, said fan receiving air directly through the opening in the hood.

In testimony whereof I affix my signature in presence of two witnesses.

JOHN GORDON COOKE.

Witnesses:
  J. R. LIVINGSTON,
  HUGH WILSON.